(12) United States Patent
Kwon (10) Patent No.: US 8,204,648 B2
(45) Date of Patent: Jun. 19, 2012

(54) APPARATUS AND METHOD FOR CONTROLLING WIPER POSITION

(75) Inventor: Mun Soon Kwon, Gyeonggi-do (KR)

(73) Assignee: Hyundai Autonet Co., Ltd., Yongin-si (KR)

( * ) Notice: Subject to any disclaimer, the term of this patent is extended or adjusted under 35 U.S.C. 154(b) by 720 days.

(21) Appl. No.: 12/370,392

(22) Filed: Feb. 12, 2009

(65) Prior Publication Data

US 2009/0248243 A1 Oct. 1, 2009

(30) Foreign Application Priority Data

Mar. 28, 2008 (KR) ........................ 10-2008-0029192

(51) Int. Cl.
*G06F 7/00* (2006.01)
(52) U.S. Cl. ........................................................ 701/36
(58) Field of Classification Search .................. 701/36, 701/1, 49; 318/467, 671, 443, 444, 446; 340/438; 180/315
See application file for complete search history.

(56) References Cited

U.S. PATENT DOCUMENTS

| | | | | |
|---|---|---|---|---|
| 5,200,676 A | * | 4/1993 | Mueller et al. | 318/444 |
| 5,239,244 A | * | 8/1993 | Teder | 318/444 |
| 5,712,547 A | * | 1/1998 | Porter et al. | 318/282 |
| 6,281,649 B1 | * | 8/2001 | Ouellette et al. | 318/443 |
| 6,384,557 B1 | * | 5/2002 | Weber et al. | 318/444 |
| 6,609,266 B1 | * | 8/2003 | Satoh et al. | 15/250.13 |
| 7,019,275 B2 | * | 3/2006 | Stam et al. | 250/208.1 |
| 7,466,096 B2 | * | 12/2008 | Kim et al. | 318/443 |
| 7,504,798 B2 | * | 3/2009 | Kawada et al. | 318/821 |
| 7,735,183 B2 | * | 6/2010 | Harita | 15/250.02 |
| 7,795,831 B2 | * | 9/2010 | Kwon et al. | 318/443 |
| 2004/0112981 A1 | * | 6/2004 | Ivanov et al. | 239/128 |
| 2007/0028410 A1 | * | 2/2007 | Weiler et al. | 15/250.23 |

FOREIGN PATENT DOCUMENTS

| | | |
|---|---|---|
| KR | 10-2006-0008407 | 1/2006 |
| KR | 10-2006-0054770 | 5/2006 |

\* cited by examiner

*Primary Examiner* — Khoi Tran
*Assistant Examiner* — Harry Oh
(74) *Attorney, Agent, or Firm* — NSIP Law (57) ABSTRACT

An apparatus and a method for controlling a wiper position are provided. The apparatus to control a wiper position includes a controller to receive a wiper operation control signal output from a user input unit to control a wiper to be stopped at a desired position, a wiper motor to drive the wiper, a wiper relay switched to drive the wiper motor under a control of the controller, and a wipe sensor to sense a position of the wiper motor to transfer a position signal to the controller.

15 Claims, 8 Drawing Sheets

APPARATUS AND METHOD FOR CONTROLLING WIPER POSITION

CROSS-REFERENCE TO RELATED APPLICATION(S)

This application claims the benefit under 35 U.S.C. §119(a) of a Korean Patent Application No. 10-2008-0029192, filed on Mar. 28, 2008 in the Korean Intellectual Property Office, the disclosure of which is incorporated herein by reference in its entirety.

TECHNICAL FIELD

The following description relates to an apparatus and method for controlling a position of a wiper.

BACKGROUND

Generally, vehicles include a wiper as a device to remove rain or snow from a windshield glass. The wiper is driven by a motor according to a user's manipulation of a wiper control switch, and the wiper installed external to the windshield glass removes the rain or snow on the windshield glass while wiping back and forth in a clockwise or counterclockwise direction in a predetermined angle according to the driving of the motor.

Figure 1:
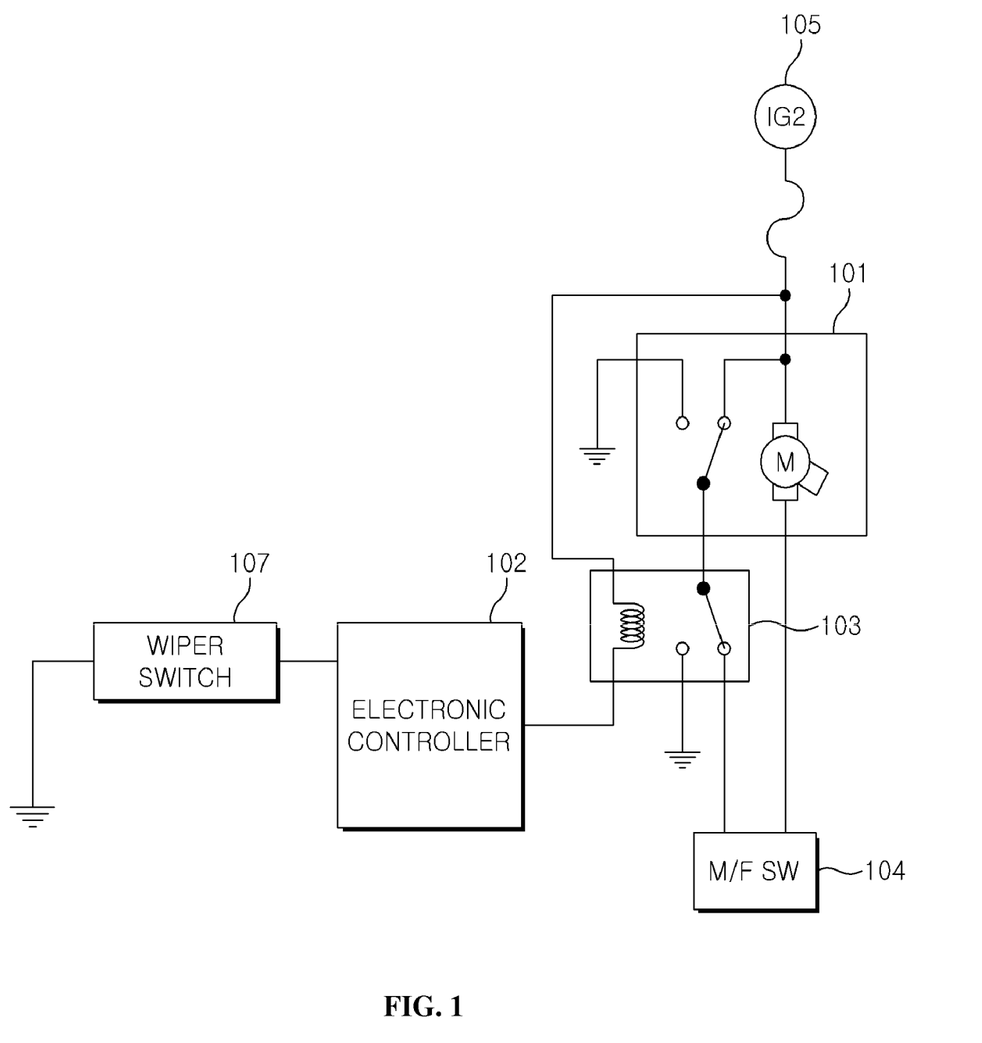
FIG. 1 is a block diagram of a wiper control apparatus.

FIG. 1 illustrates a wiper control apparatus.

Referring to FIG. 1, the wiper control apparatus includes a motor 101 to drive a wiper (not shown), an electronic controller 102 to control the motor 101, a relay 103 connecting the motor 101 to the electronic controller 102, and a multifunction switch 104 connected to the relay 103 and the motor 101 to drive the motor 101 and operate additional functions related to the operation of the wiper.

The electronic controller 102 is operated by a vehicle key (not shown), and the relay 103 is disposed between the vehicle key and the electronic controller 102.

The multifunction switch 104 controls the speed and direction of the motor 101, whether to eject a washer fluid to a windshield glass, and the turning on and off of a headlamp.

An operation of the wiper control apparatus having the above-described structure will be described below.

When a user turns the vehicle key to an ignition-2 position (ON position) 105, the electronic controller 102 is in a state that can operate the wiper.

At this point, a manipulation state of a wiper switch 107 is sensed by the electronic controller 102, and the electronic controller 102 operates the relay 103 to connect the motor 101 to the multifunction switch 104. The multifunction switch 104 controls the motor 101 to adjust the speed and reciprocation cycle of the wiper.

The wiper is stopped when power from the wiper driving motor 101 is removed.

However, when the user locks the vehicle in a state where the wiper is stopped at a certain position of the windshield glass of the vehicle, the wiper is kept in the stopped state on the windshield glass. Thus, the user typically must get into the vehicle and turn the vehicle key to the ON position in order to reposition the wiper.

Moreover, since the user cannot stop the wiper at a desired position under the operation of the wiper, it is difficult to perform work such as a wiper blade replacement work.

SUMMARY

According to an aspect, there is provided an apparatus to control a wiper position, including a controller to receive a wiper operation control signal output from a user input unit to control a wiper to be stopped at a desired position, a wiper motor to drive the wiper, a wiper relay switched to drive the wiper motor under a control of the controller, and a wipe sensor to sense a position of the wiper motor to transfer a position signal to the controller.

The wiper motor may include a sensing pad to sense a normal position of the wiper.

The wiper motor may be divided into a plurality of sensing sections and receives different voltages at the respective sensing sections.

The wiper motor may be divided into a plurality of sensing sections at which different resistances are set.

The apparatus may further include the user input unit including a wiper switch to output the wiper operation control signal in a wired fashion, and a remote key to output the wiper operation control signal in a wireless fashion.

The user input unit may output the wiper operation control signal according to an input of a user in a wired or wireless fashion.

The user input unit may be a remote key to output the wiper operation control signal in a wireless fashion.

The controller may include a radio frequency (RF) receiver to receive a wireless signal transmitted from the user input unit.

The apparatus may further include a washer motor to drive a washer, and a washer relay switched to drive the washer motor under control of the controller, wherein the user input unit receives a washer operation control signal in a wired or wireless fashion.

According to another aspect, there is provided a method for controlling a wiper position, the method including driving a wiper motor, sensing a position of the wiper motor, and stopping a wiper at a desired position according to the sensed position of the wiper motor.

The position of the wiper motor may be sensed by an open signal and a ground signal of a parking switch. When the position of the wiper motor is sensed, the wiper may be stopped at a desired position in response to a one rotation time (T1) of the wiper.

The position of the wiper motor may be sensed by a voltage, an open signal and a ground signal of a parking switch. The wiper motor may be divided into a plurality of sensing sections, and the position of the wiper motor may be sensed by applying different voltages to the sensing sections.

The position of the wiper motor may be sensed by a resistance, an open signal and a ground signal of a parking switch. The wiper motor may be divided into a plurality of sensing sections, and the position of the wiper motor may be sensed by setting different resistances to the sensing sections.

The method may further include returning the wiper to a normal position.

According to still another aspect, there is provided a vehicle comprising apparatus to control a wiper position, the apparatus including a controller to receive a wiper operation control signal output from a user input unit to control a wiper to be stopped at a desired position, a wiper motor to drive the wiper, a wiper relay switched to drive the wiper motor under control of the controller, and a wipe sensor to sense a position of the wiper motor to transfer a position signal to the controller.

Other features and aspects will be apparent from the following detailed description, the drawings, and the claims.

BRIEF DESCRIPTION OF THE DRAWINGS

FIGS. 6(a') to 6(c') illustrate signals output during a driving of the wiper motor of FIG. 5.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF EMBODIMENTS

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 2:
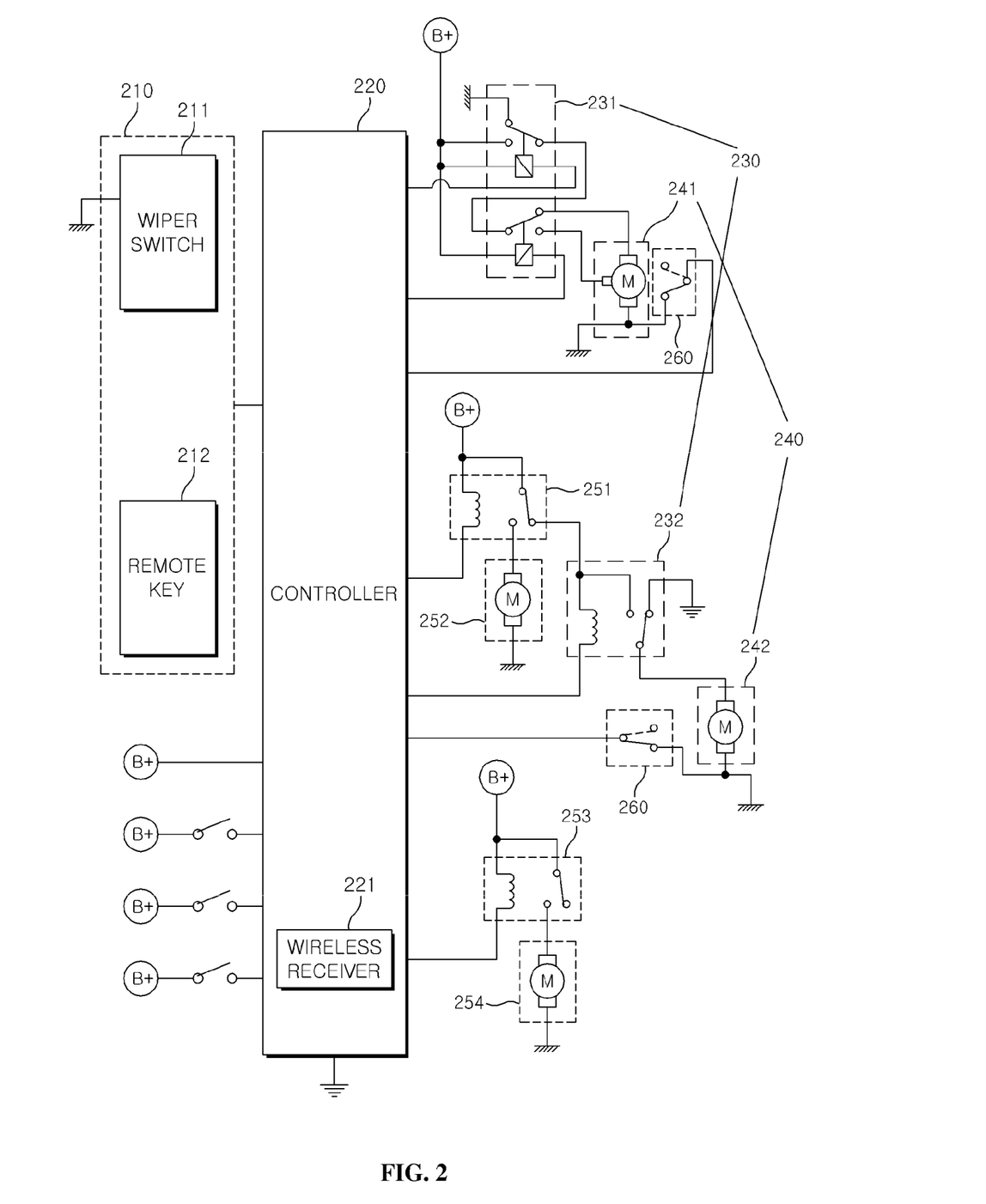
FIG. 2 is a block diagram of an exemplary apparatus to control a wiper position.

FIG. 2 illustrates an exemplary apparatus to control a wiper position.

Referring to FIG. 2, the apparatus includes a user input unit 210 to output a wiper operation control signal in a wired or wireless fashion according to a user's manipulation, a controller 220 to receive the wiper operation control signal output from the user input unit 210 and control, for example, the stopping of a wiper at a desired position, a wiper motor 240 to drive the wiper, a wiper relay 230 switched to drive the wiper motor 240 under the control of the controller 220, and a wiper sensor 260 to sense the position of the wiper motor 240 and transfer a sensing signal to the controller 220.

Moreover, the apparatus to control the wiper position may further include washer motors 252 and 254 to drive a washer, and washer relays 251 and 253 switched to drive the washer motors 252 and 254 under the control of the controller 220. The user input unit 210 may receive a washer operation control signal in a wired or wireless fashion.

The user input unit 210 may include a wiper switch 211 to receive the user's manipulation corresponding to the operation of the wiper to output the wiper operation control signal in a wired fashion, or a remote key 212 to receive the user's manipulation corresponding to the operation of the wiper to output the wiper operation control signal in a wireless fashion. The user input unit 210 controls the wiper motor 240 to adjust the rotation speed and reciprocation cycle of the wiper rotating back and forth on a windshield glass of a vehicle. The user input unit 210 may control other devices including a headlamp and a washer fluid ejecting device to wipe the windshield glass of the vehicle.

The controller 220 may be connected to a battery via the wiper relay 230 to always receive power, and control the wiper relay 230 to operate the wiper motor 240. Herein, the controller 220 may receive a position signal of the wiper motor 240 sensed by the wiper sensor 260 and control the wiper to be placed at a desired position.

The controller 220 may include a wireless receiver, for example, a radio frequency (RF) receiver 221 to receive a wireless signal transmitted from the user input unit 210.

The wiper motor 240 may be mounted in a front portion 241 and a rear portion 242 of the vehicle, and connected to one side of the wiper (not shown) to rotate the wiper along the surface of the windshield glass. Herein, the wiper motor 240 may include a sensing pad to sense a normal position of the wiper.

The wiper relay 230 may receive power from a battery B+ and be switched and connected to the wiper motor 240 according to a control signal output from the controller 220.

The wiper sensor 260 may include a parking switch and sense the position of the wiper motor 240 according to an open signal (OPEN) and a ground signal (GND). Herein, the wiper sensor 260 may sense a wiper normal position stop by sensing the sensing pad of the wiper motor 240 connected to the ground.

Figure 3:
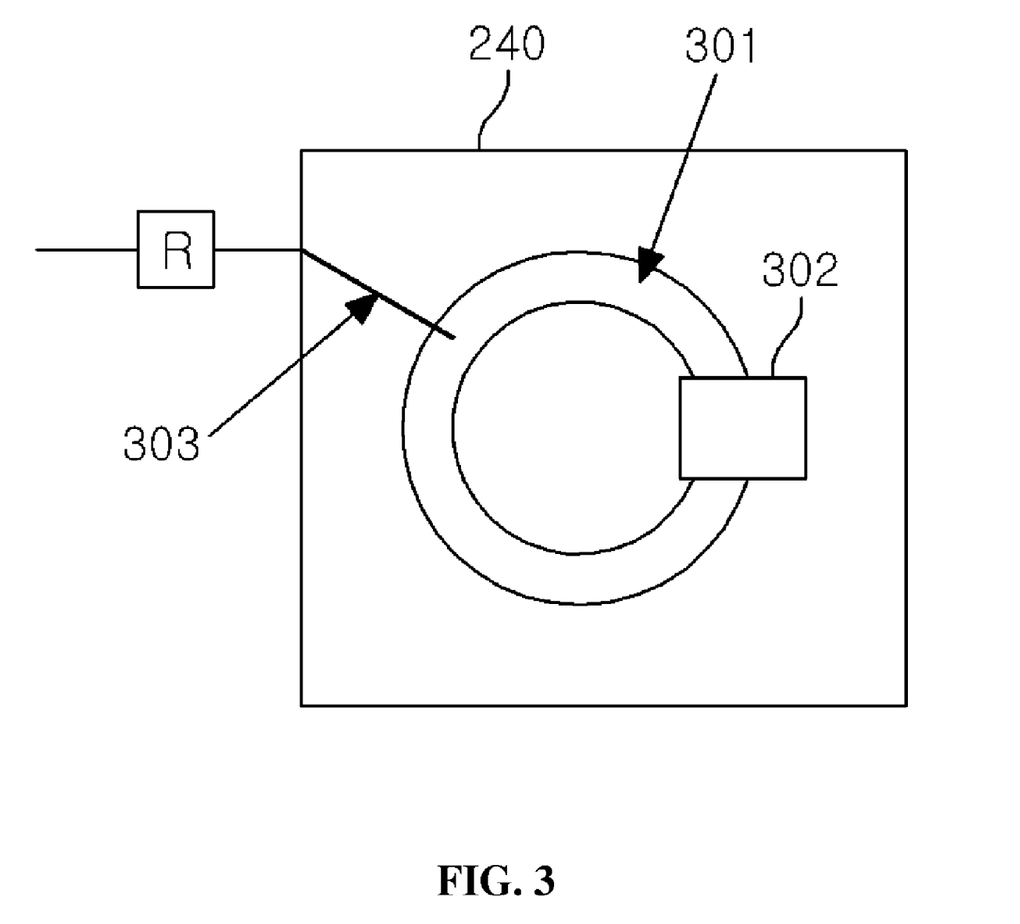
FIG. 3 is a conceptual view of an exemplary wiper motor.
Figure 4:
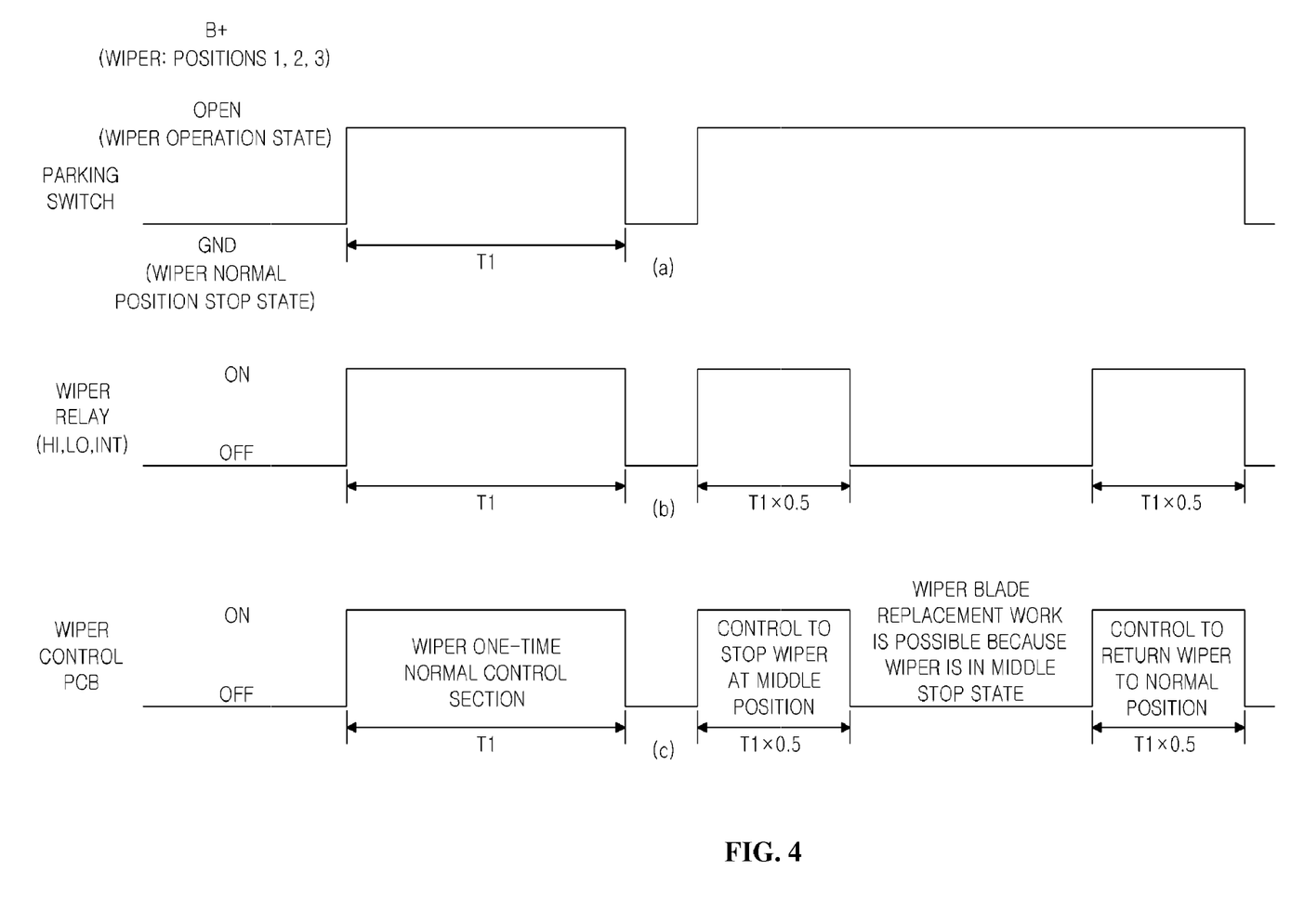
FIGS. 4(a) to 4(c) illustrate signals output during a driving of the wiper motor of FIG. 3.

FIG. 3 illustrates a conceptual view of an exemplary wiper motor, and FIGS. 4(a) to 4(c) illustrate signals output during a driving of the wiper motor of FIG. 3.

Referring to FIG. 3, the wiper motor 240 includes a sensing pad 302. Upon rotation 301 of the wiper motor 240, the normal position is sensed while the sensing pad 302 is coming into contact with a parking switch 303. Referring to FIGS. 4(a) to 4(c), the position of the wiper motor 240 is sensed by the open signal OPEN and the ground signal GND of the parking switch 303 in FIG. 4(a). When the position of the wiper motor 240 is sensed, the wiper is stopped at a desired position in response to one rotation time T1 of the wiper in order to control the operation of the wiper in FIG. 4(c).

For example, if the one rotation time T1 of the wiper (counterclockwise rotation time or clockwise rotation time) is preset, T1/2 may be a control time taken until the wiper is placed at the exact center portion. If needed, the control time may be T1/3, T1/4 and T1/5. In this case, a return time taken until the wiper returns to the normal position may be T2/3, T3/4 and T4/5. That is, the time T1 and a time for a desired stop position are measured, and the operation time of the wiper relay 230 of FIG. 4(b) and the return control of FIG. 4(c) are defined and controlled on the basis of the measured time.

Figure 5:
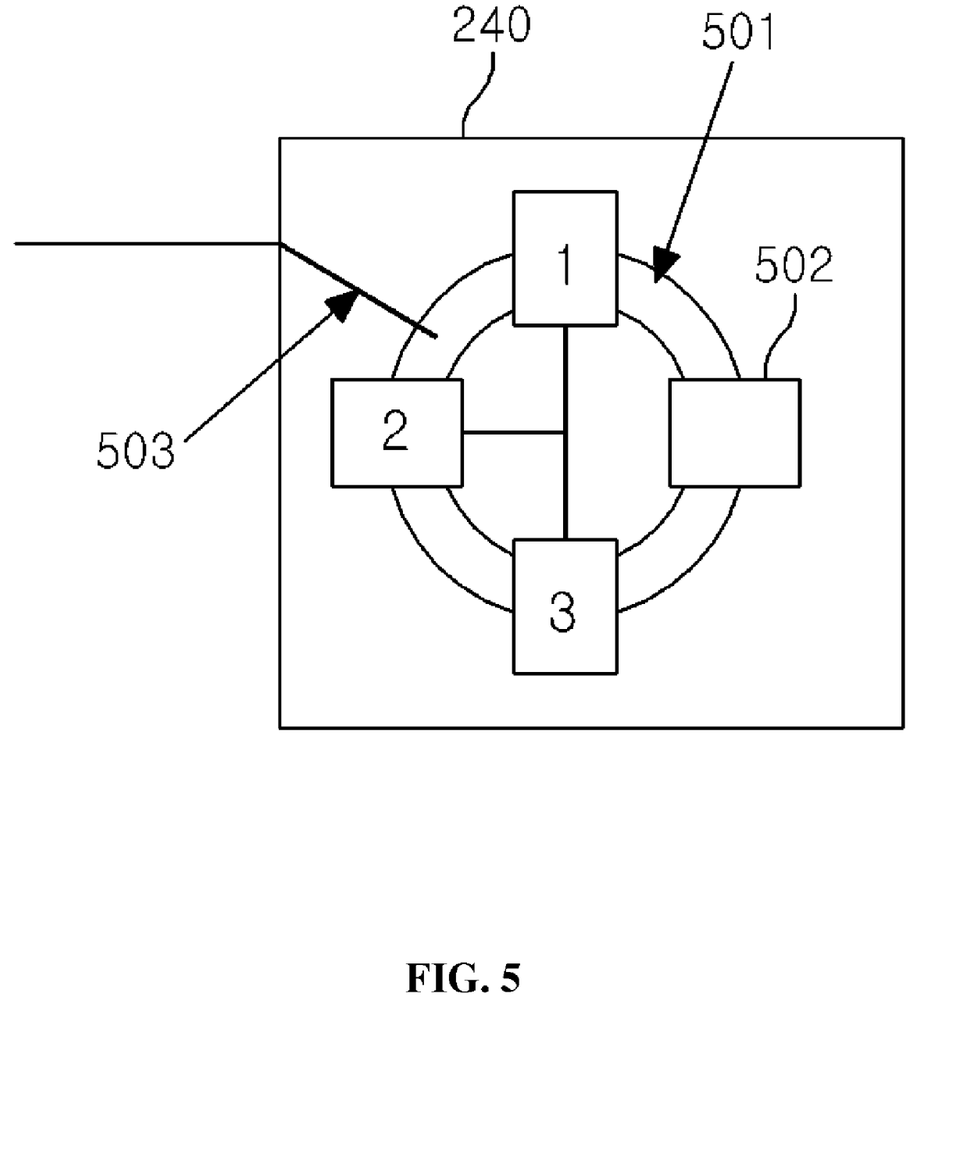
FIG. 5 is a conceptual view of another exemplary wiper motor.

FIG. 5 illustrates a conceptual view of another exemplary wiper motor, and FIGS. 6(a) to 6(c) illustrate signals during a driving of the wiper motor of FIG. 5.

Referring to FIG. 5, in this example, the wiper motor 240 includes a sensing pad 502, is divided into a plurality of sensing sections, for example, sections 1, 2 and 3, and receives different voltages at the sensing sections. The reference numeral 501 denotes rotation of the wiper motor 240. While three sections are shown, it is understood that the wiper motor 240 may be divided into a different number of sensing sections, for example, eight sections or sixteen sections.

Figure 6:
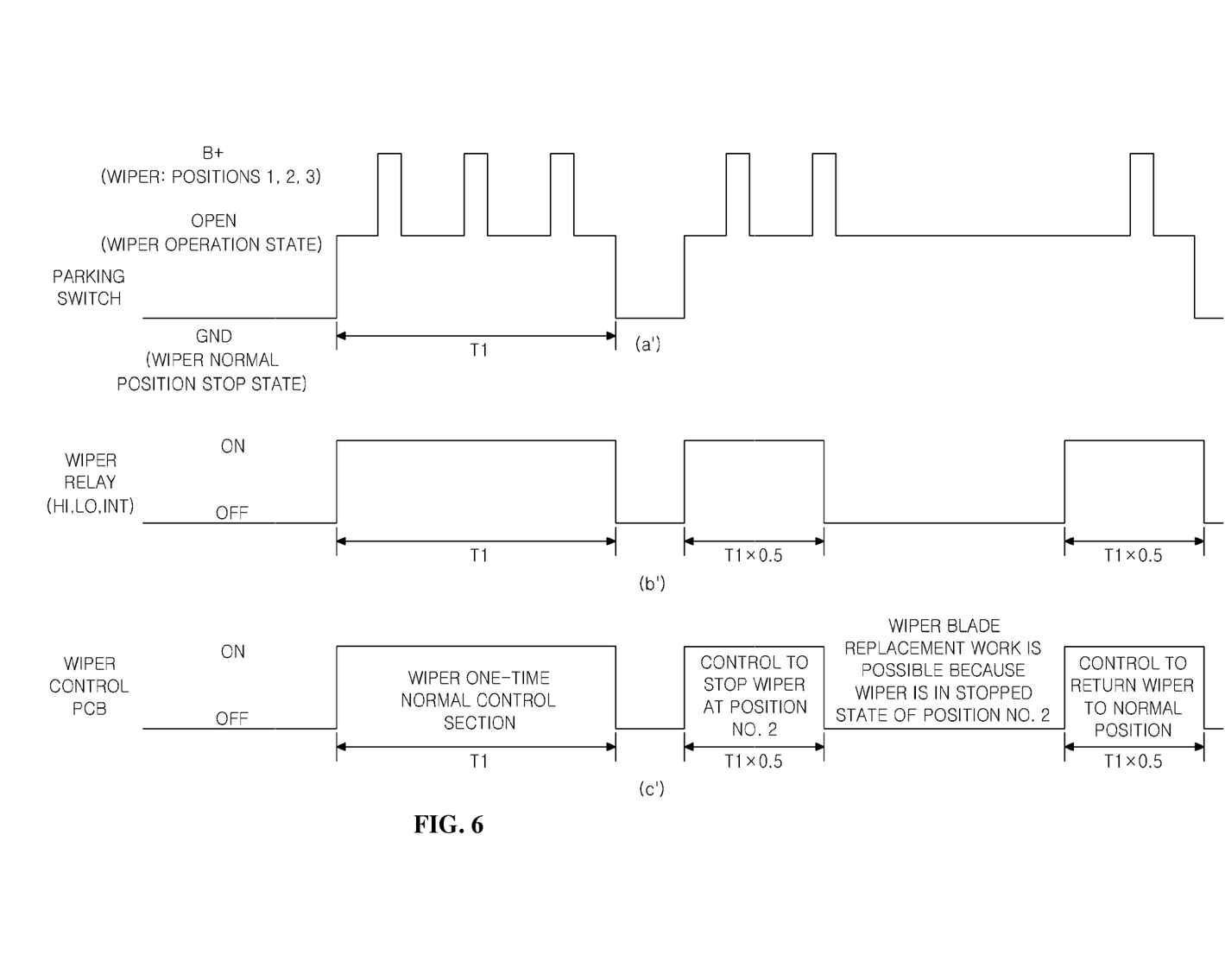

Referring to FIGS. 6(a') to 6(c'), the position of the wiper motor 240 is sensed by the voltage, the open signal OPEN and the ground signal GND of the parking switch in FIG. 6(a'). Herein, B+ may be on the basis of a preset value in order to determine the position of the wiper.

For example, the parking switch 503 senses the position of the wiper motor 240 on the basis of the position signals and controls the wiper to be stopped at a desired position in FIG. 6(c'). The wiper relay 230 is driven after the wiper stop in FIG. 6(b'), and the operation of the wiper relay 230 is turned off when the ground signal GND (the normal position stop signal) is sensed. At this point, the wiper motor is returned to the normal position and stopped.

Figure 7:
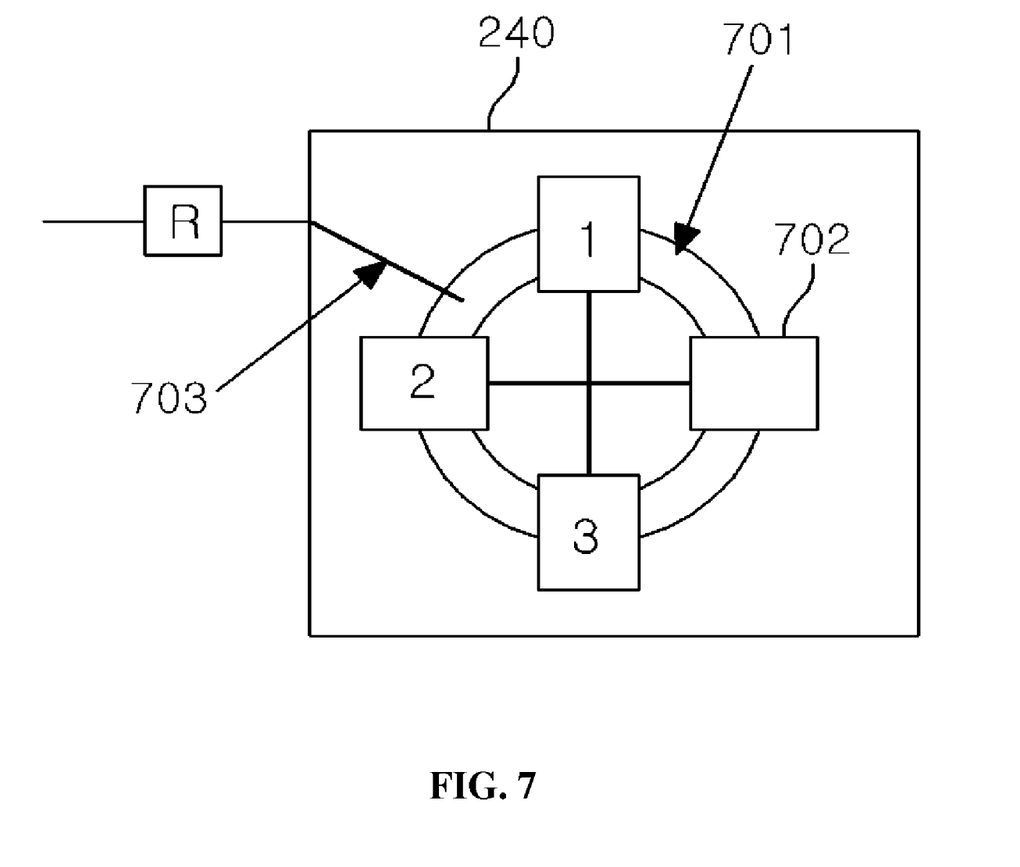
FIG. 7 is a conceptual view of another exemplary wiper motor.

FIG. 7 illustrates a conceptual view of still another exemplary wiper motor.

Referring to FIG. 7, in this example, the wiper motor 240 includes a sensing pad 702 and is divided into a plurality of sensing sections, for example, sections 1, 2 and 3 at which different resistances are set, and the position of the wiper motor 240 is sensed at the sensing sections 1, 2 and 3. The reference numeral 701 denotes rotation of the wiper motor 240.

For example, the position of the wiper motor 240 is sensed by the resistance, the open signal OPEN and the ground signal GND of a parking switch 703. That is, when the wiper motor 240 is placed at the sensing sections 1, 2 and 3, the position of the wiper motor 240 is calculated by sensing a difference in voltages applied to a resistor R.

As an illustration, it is assumed that resistances at the sensing sections 1, 2 and 3 are 100Ω, 200Ω and 300Ω, respectively, and a resistance at the sensing pad is 0Ω (GND), and the voltages at the other positions are sensed in an opened state because there are no resistors in the other positions.

Figure 8:
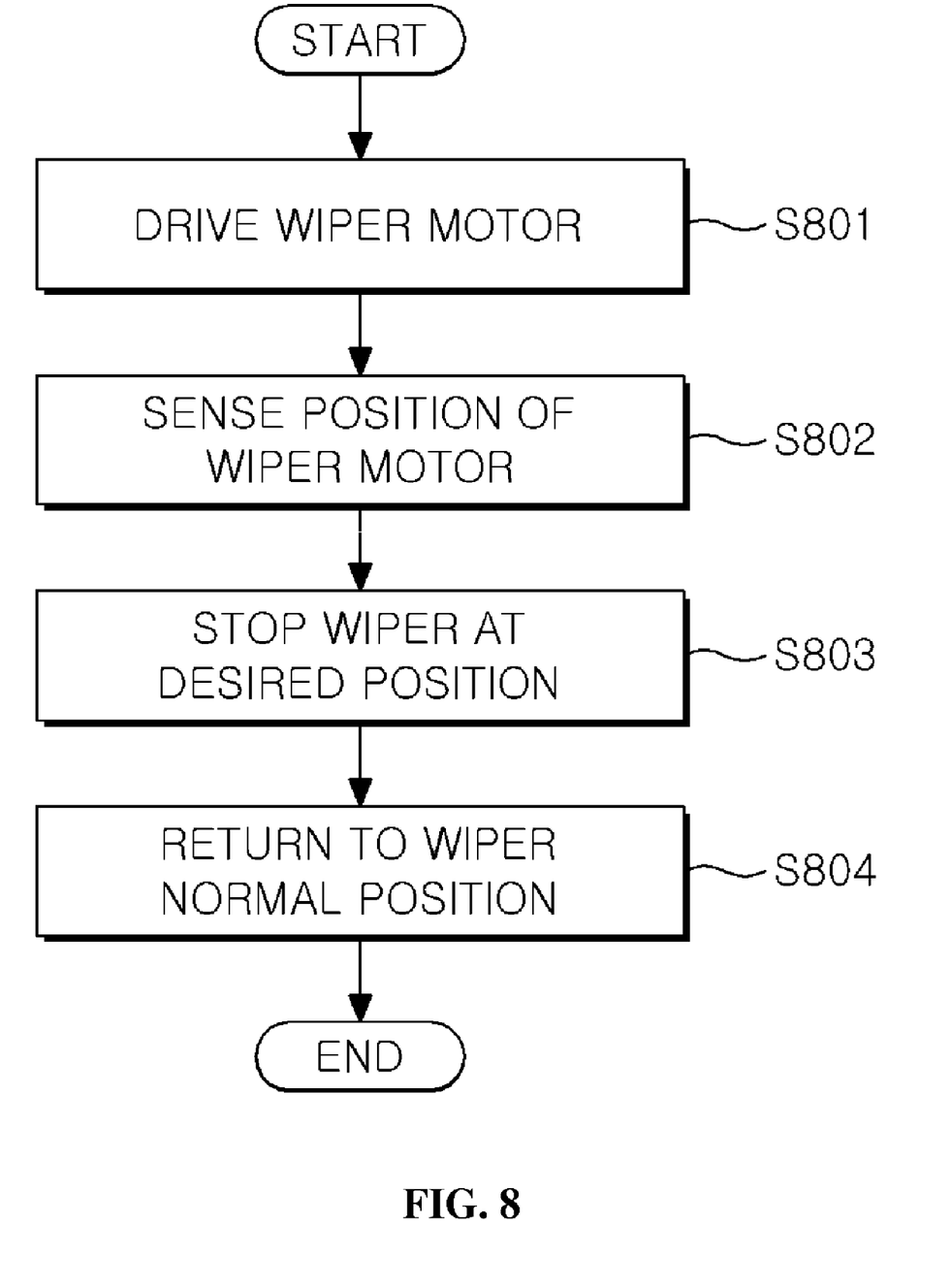
FIG. 8 is a flowchart illustrating an exemplary method for controlling a wiper position.

FIG. 8 is a flowchart illustrating an exemplary method for controlling a wiper position.

Referring to FIG. 8, the wiper motor 240 is driven in operation S801.

The position of the wiper motor 240 is sensed in operation S802.

For example, a scheme of sensing the position of the wiper motor 240 may include any one of: a scheme where the position of the wiper motor 240 is sensed by the open signal OPEN and the ground signal GND of a parking switch; a scheme where the position of the wiper motor 240 is sensed by the voltage, the open signal OPEN and the ground signal GND of the parking switch; and a scheme where the position of the wiper motor 240 is sensed by the resistance, the open signal OPEN and the ground signal GND of the parking switch.

The scheme using the open signal OPEN and the ground signal GND of the parking switch may calculate the one rotation time of the wiper to sense the position of the wiper motor 240.

The scheme using the voltage of the parking switch may divide the wiper motor 240 into a plurality of sensing sections, and apply different voltages to the sensing sections to sense the position of the wiper motor 240.

The scheme using the resistance of the parking switch may divide the wiper motor 240 into a plurality of sensing sections, and set different resistances to the sensing sections to sense the position of the wiper motor 240.

The wiper is stopped at a desired position in response to the sensed position of the wiper motor 240 in operation S803. For example, a driver performs a control to place the wiper at a desired stop position, and thus, for example, the driver may replace the wiper blade in the stopped state.

The wiper is returned to a normal position in operation S804.

According to certain examples described above, a wiper is stopped at a position that a user/driver desires.

Moreover, the wiper may be controlled in a wired or wireless fashion, and the user/driver may control the wiper even in the outside of the vehicle in a state where the vehicle is turned off.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus to control a wiper position, comprising:
a controller to receive a wiper operation control signal output from a user input unit to control a wiper to be stopped at a desired position;
a wiper motor to drive the wiper;
a wiper relay switched to drive the wiper motor under a control of the controller; and
a wiper sensor having a parking switch to sense a position of the wiper motor according to an open signal and a ground signal of the parking switch to transfer a position signal to the controller,
wherein the wiper motor is divided into a plurality of sensing sections at which different resistances are set and receives different voltages at the respective sensing sections.

2. The apparatus of claim 1, wherein the wiper motor comprises a sensing pad to sense a normal position of the wiper.

3. The apparatus of claim 1, further comprising the user input unit including a wiper switch to output the wiper operation control signal in a wired fashion, and a remote key to output the wiper operation control signal in a wireless fashion.

4. The apparatus of claim 1, wherein the user input unit outputs the wiper operation control signal according to an input of a user in a wired or wireless fashion.

5. The apparatus of claim 1, wherein the user input unit is a remote key to output the wiper operation control signal in a wireless fashion.

6. The apparatus of claim 1, wherein the controller comprises a radio frequency (RF) receiver to receive a wireless signal transmitted from the user input unit.

7. The apparatus of claim 1, further comprising:
a washer motor to drive a washer; and
a washer relay switched to drive the washer motor under control of the controller,
wherein the user input unit receives a washer operation control signal in a wired or wireless fashion.

8. A method for controlling a wiper position, the method comprising:
driving, via a processor, a wiper motor;
sensing a position of the wiper motor by a wiper sensor having a parking switch according to an open signal and a ground signal of the parking switch; and
stopping a wiper at a desired position according to the sensed position of the wiper motor, wherein the wiper motor is divided into a plurality of sensing sections at which different resistances are set and receives different voltages at the respective sensing sections.

9. The method of claim 8, wherein when the position of the wiper motor is sensed, the wiper is stopped at a desired position in response to a one rotation time (T1) of the wiper.

10. The method of claim 8, wherein the position of the wiper motor is sensed by a voltage, an open signal and a ground signal of a parking switch.

11. The method of claim 10, wherein the wiper motor is divided into a plurality of sensing sections, and the position of the wiper motor is sensed by applying different voltages to the sensing sections.

12. The method of claim 8, wherein the position of the wiper motor is sensed by a resistance, an open signal and a ground signal of a parking switch.

13. The method of claim 12, wherein the wiper motor is divided into a plurality of sensing sections, and the position of the wiper motor is sensed by setting different resistances to the sensing sections.

14. The method of claim 8, further comprising returning the wiper to a normal position.

15. A vehicle comprising the apparatus of claim 1.

* * * * *